C. S. RUCKSTUHL.
THERMOMETER.
APPLICATION FILED MAR. 23, 1912.
1,034,735.
Patented Aug. 6, 1912.
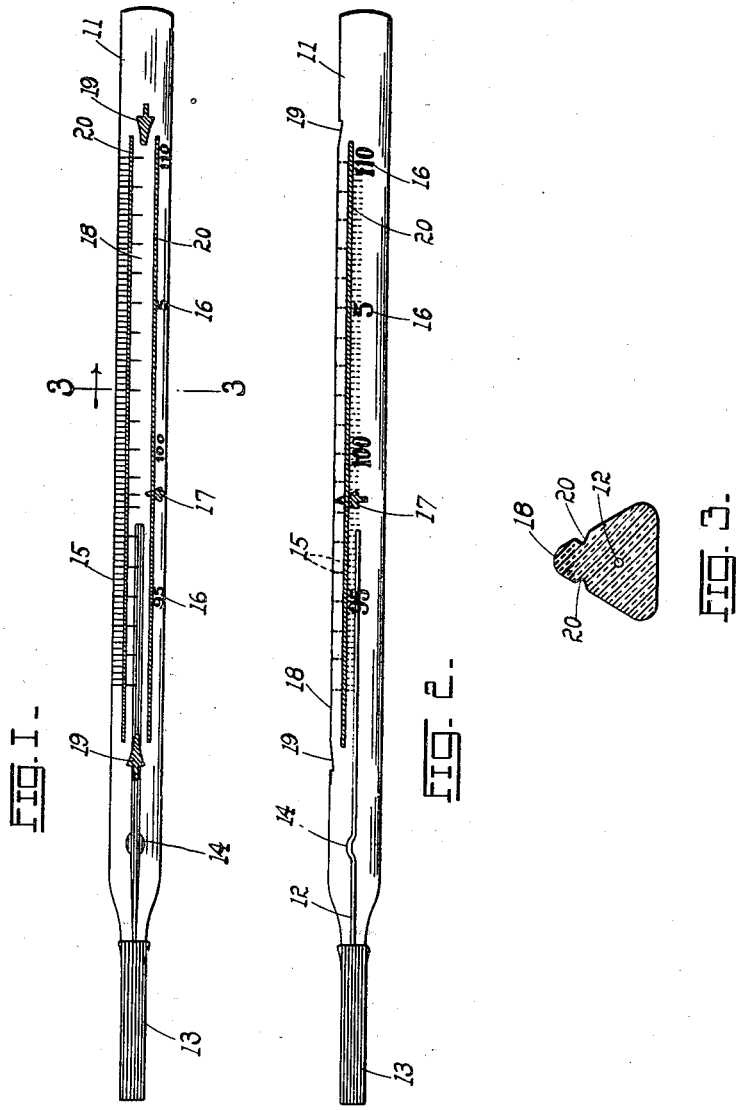

UNITED STATES PATENT OFFICE.

CHARLES S. RUCKSTUHL, OF ST. LOUIS, MISSOURI.

THERMOMETER.

1,034,735. Specification of Letters Patent. Patented Aug. 6, 1912.

Application filed March 23, 1912. Serial No. 685,741.

*To all whom it may concern:*

Be it known that I, CHARLES S. RUCKSTUHL, a citizen of the United States, and a resident of the city of St. Louis and State of Missouri, have invented a new and useful Improvement in Thermometers, of which the following is a specification.

My invention relates particularly to that class of thermometers known as fever thermometers, and is intended to facilitate the reading of such instruments by inexperienced persons, thus adapting them for family use.

My improvement consists in providing a thermometer stem or tube having a part-cylindrical lens portion through which the thread of mercury may be viewed, and a scale engraved on the stem alongside of the lens portion in position to be viewed concurrently, with means for readily locating the angle at which the thermometer must be held in order that it may be read easily.

My improvements further consist in the details of construction of the thermometer illustrated in the accompanying drawings, and are pointed out with more particularity in the appended claims.

In the drawings, in which like characters refer to like parts wherever they occur, Figure 1 is a face view of my improved thermometer on an enlarged scale; Fig. 2 is a side view on the same scale as Fig. 1; and Fig. 3 is a transverse sectional view of the same on a larger scale than Figs. 1 and 2.

Referring to the drawings, my thermometer comprises a straight stem 11 substantially in the form of a triangular prism with rounded corners and provided with a very fine axial bore or tube 12 sealed at one end and leading to a bulb 13 at the other end. At a point 14 near the bulb end of the stem the axial bore is widened and slightly kinked for the purpose of breaking the continuity of the mercury thread and retaining the part in the axial bore as an index of the maximum height to which the mercury has risen in the bore under the influence of the temperature to which the bulb has been subjected. This disconnected thread of mercury may be shaken down into the bulb after the reading has been noted.

On one of the sides of the prismatic stem is engraved a scale of divisions 15 indicating degrees subdivided into fifth parts, and on the other side numerals 16 are engraved to correspond with certain of the degree marks. I prefer to mark the numerals in black and to place a red arrow 17 opposite the scale division corresponding to a temperature of 98.4° Fahrenheit. The rounded angle of the prism 18 between the scale divisions and numerals is marked at the ends by two red arrows 19 arranged along the apex of the prism and pointing toward each other. The flattened side of the stem opposite the rounded angle bearing the arrows is whitened to provide a background against which the scale and numerals will appear distinct. The sides of the prism, where the rounded angle 18 joins them, are slightly reëntrant or undercut, and red lines 20 are marked along the stem at these two places. The part of the stem lying along the rounded angle and embraced between the two red lines 20 (indicated in Fig. 3 by heavy line cross-hatching) forms a part-cylindrical lens through which the mercury thread, in diameter actually about half the size of a human hair, appears magnified sufficiently to fill about one-half the space between the red lines 20, and partly coincident with the longer lines marking the divisions of the scale. There is but a small angle through which the mercury thread can be viewed satisfactorily, but the red arrows 19 are so positioned on the stem that when the thermometer is held correctly for reading they will appear to be half-way between the red lines 20 and in line with the thread of mercury. By means of the arrows 19 for locating the thread of mercury and because of the peculiar formation of the sides and rounded angle of the prism, which prevents any confusing scintillation or reflection of light on the sides of the prism, an inexperienced person can read my thermometer with ease and certainty.

While the device I have illustrated and described herein is primarily intended for a fever thermometer, my invention is obviously applicable to other similar apparatus, and I do not wish to be understood as limiting it to use in connection with fever thermometers.

What I claim as my invention and desire to secure by Letters Patent is as follows:

1. In a thermometer stem, a longitudinal lens portion separated from the remaining portion of the stem by longitudinal grooves therein defining the angular aperture of said lens.

2. In a thermometer stem, a longitudinal lens portion separated from the remaining portion of the stem by longitudinal grooves therein defining the angular aperture of said lens, and coloring matter in said grooves.

Signed at St. Louis, Missouri, this 20th day of March, 1912.

CHARLES S. RUCKSTUHL.

Witnesses:
 AMASA M. HOLCOMBE,
 M. A. SKELTON.